(12) United States Patent
Huang (10) Patent No.: US 8,922,513 B2
(45) Date of Patent: Dec. 30, 2014

(54) MULTI-MONITOR SYSTEM AND MULTI-MONITOR CONTROLLING METHOD

(75) Inventor: Hung-Chi Huang, New Taipei (TW)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 134 days.

(21) Appl. No.: 13/593,532

(22) Filed: Aug. 24, 2012

(65) Prior Publication Data

US 2013/0314333 A1 Nov. 28, 2013

(30) Foreign Application Priority Data

May 25, 2012 (TW) .............................. 101118813 A (51) Int. Cl.
*G06F 3/041* (2006.01)

(52) U.S. Cl.
USPC ............................................ 345/173; 345/1.1

(58) Field of Classification Search
CPC ....................................................... G06F 3/041
USPC ......... 345/1.1, 1.2, 1.3, 4, 156, 173–177, 211
See application file for complete search history.

(56) References Cited

U.S. PATENT DOCUMENTS

| 7,843,401 | B2 * | 11/2010 | Morikawa et al. ................. 345/4 |
| 7,948,450 | B2 * | 5/2011 | Kay et al. ........................ 345/1.3 |
| 2008/0211825 | A1 * | 9/2008 | Sunakawa et al. ............. 345/581 |
| 2009/0244001 | A1 * | 10/2009 | Nakai et al. .................... 345/156 |
| 2011/0102299 | A1 * | 5/2011 | Hochmuth et al. ............ 345/1.2 |

* cited by examiner

*Primary Examiner* — Andrew Sasinowski
(74) *Attorney, Agent, or Firm* — Novak Druce Connolly Bove + Quigg LLP (57) ABSTRACT

An exemplary multi-monitor method includes controlling a first position determining unit and a second position determining unit of a corresponding monitor to emit signals. Then, the method determines which of the first position determining unit and the second position determining unit of the corresponding monitor has received the signal. The method next determines the position of the corresponding monitor among all of the monitors, and determines a new coordinate range of the corresponding monitor in the Cartesian coordinate system. Then the method determines which point has been touched in response to a user touch on the touch unit, and determines the new set of coordinates in the Cartesian coordinate system corresponding to the touched point. Next, the method determines one or more touched monitors, and controls the determined one or more touched monitors to execute the corresponding operation.

12 Claims, 5 Drawing Sheets

MULTI-MONITOR SYSTEM AND MULTI-MONITOR CONTROLLING METHOD

BACKGROUND

1. Technical Field

The present disclosure relates to multi-monitor systems and, more particularly, to a multi-monitor system capable of controlling the operation of a number of monitors in response to user touch, and a multi-monitor controlling method.

2. Description of Related Art

In a conventional multi-monitor system, two or more monitors are connected to one host so that the monitors are used as one large monitor. However, in the conventional multi-monitor system, a mouse is connected to the host. The mouse must be moved frequently to operate a corresponding monitor. The need to frequently move the mouse is inconvenient to the user. Therefore, it is desired to be a multi-monitor method to resolve the above problem.

BRIEF DESCRIPTION OF THE DRAWINGS

The components in the drawings are not necessarily drawn to scale, the emphasis instead being placed upon clearly illustrating the principles of the multi-monitor system and multi-monitor method. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
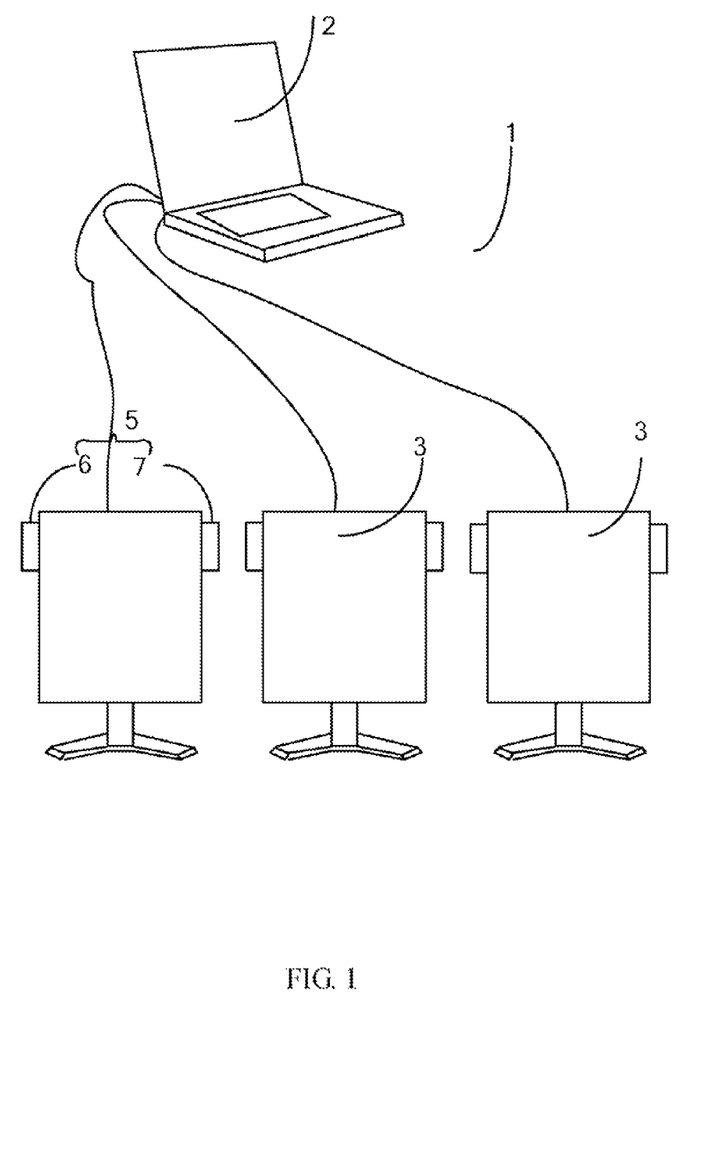
FIG. 1 is a view illustrating a multi-monitor system in accordance with an exemplary embodiment.
Figure 2:
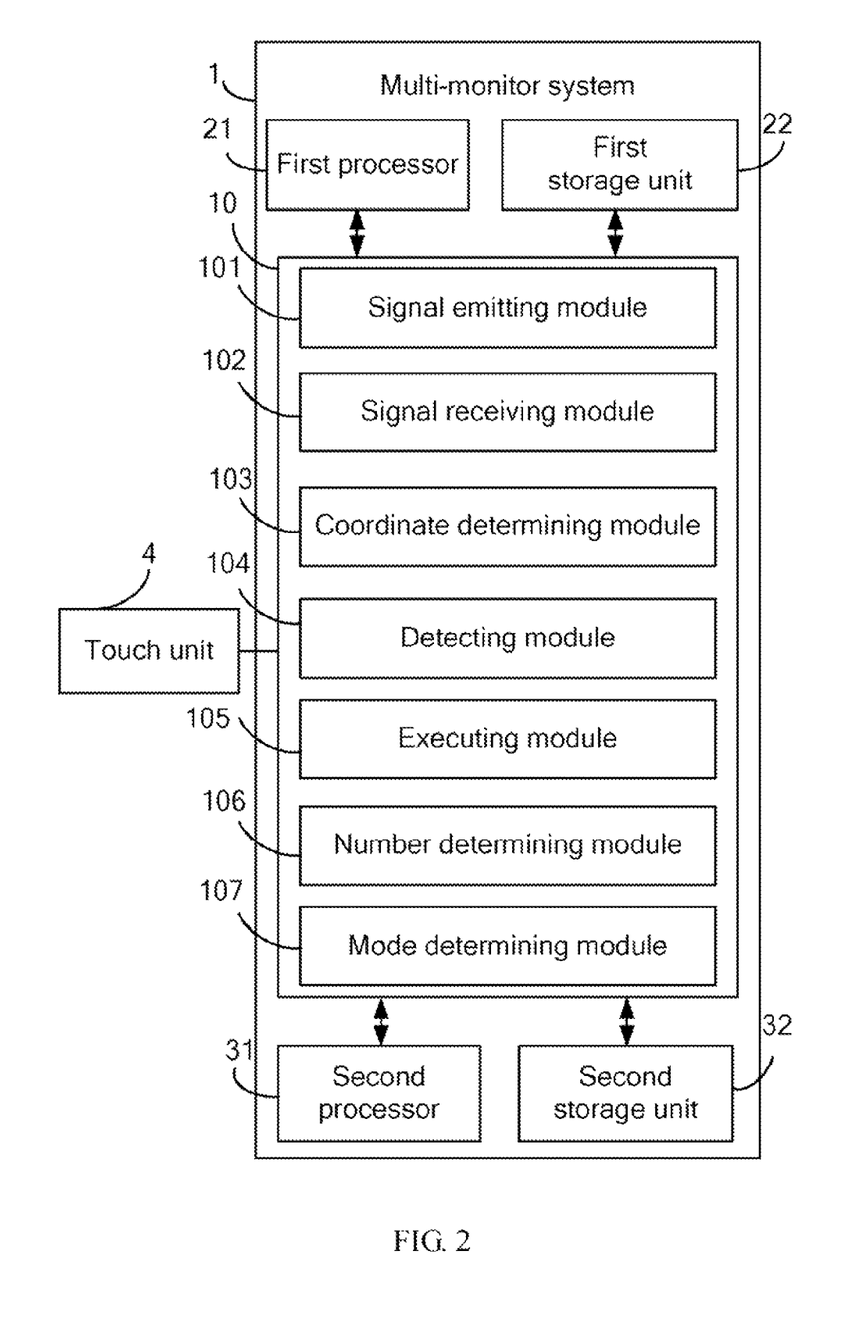
FIG. 2 is a block diagram of the multi-monitor system of FIG. 1.

FIGS. 1-2 shows a multi-monitor system 1 in accordance with an exemplary embodiment. The multi-monitor system 1 includes a host 2 and a number of monitors 3. Each monitor 3 communicates with the host 2 through a wired or a wireless connection. In the embodiment, two or three monitors 3 are employed to illustrate the disclosure. The multi-monitor system 1 has a number of display modes, such as for example, mirror mode and extended desktop mode. In the extended desktop mode, the number of monitors 3 are used together to form a single large monitor which has a Cartesian coordinate system across the monitors 3. Sizes of each monitor 3 are the same. Each monitor 3 is connected to a touch unit 4 and includes a positioning determining module 5. When the multi-monitor system 1 is in the extended desktop mode, the multi-monitor system 1 can determine a position of each monitor 3 among all of the monitors 3 according to signals received by the positioning determining module 5, determine a new set of coordinates corresponding to a touched point on the touch unit 4 in the Cartesian coordinate system, determine which monitor 3 has been touched according to the determined new set of coordinates corresponding to the touched position and the determined position of each monitor 3, and further control the relevant monitor 3 to execute a corresponding operation. In the embodiment, the position of each monitor 3 can be represented within a coordinate range in the Cartesian coordinate system.

The positioning determining module 5 can be infrared emitting/receiving units or USBs. In the embodiment, the positioning determining module 5 includes a first position determining unit 6 and a second position determining unit 7. The first position determining unit 6 and the second position determining unit 7 are respectively on opposite sides of the monitor 3. When the monitors 3 are arranged horizontally, the first position determining unit 6 and the second position determining unit 7 are respectively on the left side and right side of the monitor 3. When the monitors 3 are arranged vertically, the first position determining unit 6 and the second position determining unit 7 are respectively arranged on the top side and the bottom side of the monitor 3. The arrangement of the first position determining unit 6 and the second position determining unit 7 on opposite sides of the monitor 3, means that when the first position determining unit 6 of the monitor 3 emits a signal, the second position determining unit 7 of another monitor 3 which is on the right edge/bottom edge of the monitor 3 can receive the signal. When the second position determining unit 7 of the monitor 3 emits a signal, the first position determining unit 6 of another monitor 3 which is on the left edge/top edge of the monitor 3 can receive the signal. The positioning determining module 5 can include four positioning determining units, each one arranged on the right side, the left side, the top side, and the bottom side of the monitor 3.

The host 2 includes a first processor 21 and a first storage unit 22. Each monitor 3 includes a second processor 31 and a second storage unit 32. The multi-monitor system 1 includes a signal emitting module 101, a signal receiving module 102, a coordinate determining module 103, a detecting module 104, and an executing module 105. The signal emitting module 101, the signal receiving module 102, the coordinate determining module 103, and the detecting module 104 are stored in the second storage unit 32 and executed by the second processor 31. The executing module 105 is stored in the first storage unit 22 and executed by the first processor 21. Signals transmitted between the host 2 and the monitors 3 will not be described here. The second storage unit 32 of each monitors 3 further stores an initial coordinate range (0, 0)-(a, b) of the monitor 3 in the Cartesian coordinate system. Each set of coordinates in the initial coordinate range corresponds to one touch point on the touch unit 4 of the monitor 3.

The signal emitting module 101 of each monitor 3 controls the first position determining unit 6 and the second position determining unit 7 of the corresponding monitor 3 to emit signal.

The signal receiving module 102 of each monitor 3 determines which of the first position determining unit 6 and the second position determining unit 7 of the corresponding monitor 3 has received the signal.

The coordinate determining module 103 of each monitor 3 determines the position of the corresponding monitor 3 among all of the monitors 3 according to the determined first position determining unit 6 and/or second position determining unit 7, and determines a new coordinate range of the corresponding monitor 3 in the Cartesian coordinate system according to the determined position of the monitor 3 and the stored initial coordinate range.

The detecting module 104 of each monitor 3 determines the touched point in response to a user touch on the touch unit 4, and determines the new set of coordinates in the Cartesian coordinate system corresponding to the touched point according to the determined new coordinate range of the monitor 3.

The executing module 105 of the host 2 determines one or more touched monitors 3 according to the determined one or more new set of coordinates and the determined new coordinate range of each monitor 3, and controls the determined one or more touched monitors 3 to execute the corresponding operation. For example, if the initial coordinate range of each monitor 3 is (0, 0)-(40, 40), when the detecting module 104 of one monitor 3 determines that the new set of coordinates corresponding to the determined touched point is (75, 40), the executing module 105 of the host 2 determines that the touched monitor 3 is the monitor 3 whose new coordinate range is (41, 40)-(80, 40).

In the embodiment, the multi-monitor system 1 further includes a number determining module 106. The number determining module 106 is stored in the first storage unit 22 and executed by the first processor 21. The number determining module 106 of the host 2 determines the total number of the monitors 3 connected to the host 2.

Figure 3:
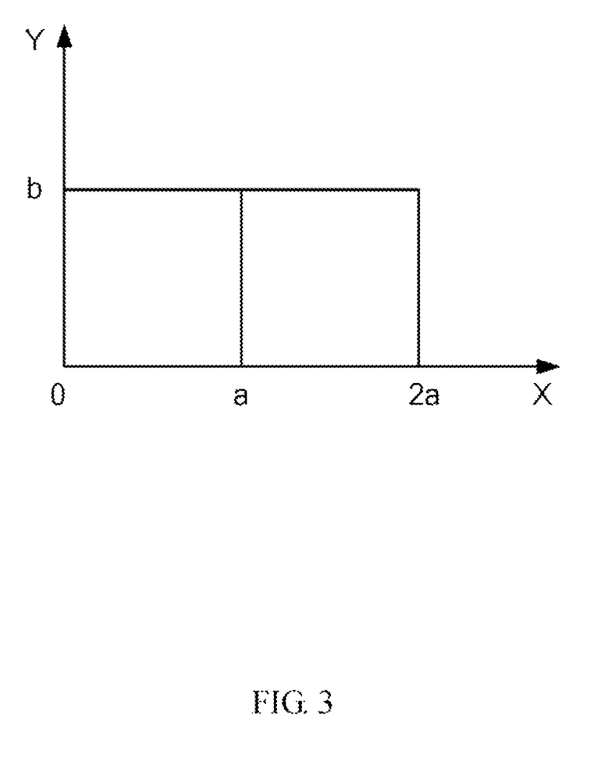
FIG. 3 is a view showing how to determine the new coordinate range of each monitor in a first embodiment.

Referring to FIG. 3, when the number of the monitors 3 connected to the host 2 is two, the second position determining unit 7 of a left/top monitor 3 can receive the signal emitted from the first position determining unit 6 of a right/bottom monitor 3, while the first position determining unit 6 of the right/bottom monitor 3 can receive the signal emitted from the second position determining unit 7 of the left/top monitor 3. Thus, the signal receiving module 102 of the left/top monitor 3 determines that the second position determining unit 7 of the left/top monitor 3 has received the signal, the coordinate determining module 103 of the left/top monitor 3 determines that the position of the left/top monitor 3 is on the left edge/up edge, and also determines that the new coordinate range of the left/top monitor 3 is (0, 0)-(a, b). The signal receiving module 102 of the right/bottom monitor 3 determines that the first position determining unit 6 of the right/bottom monitor 3 has received the signal, the coordinate determining module 103 of the right/bottom monitor 3 determines that the position of the monitor 3 is on the right edge/bottom edge, and also determines that the new coordinate range of the right/bottom monitor 3 is (a+1, b)-(2a, b).

Figure 4:
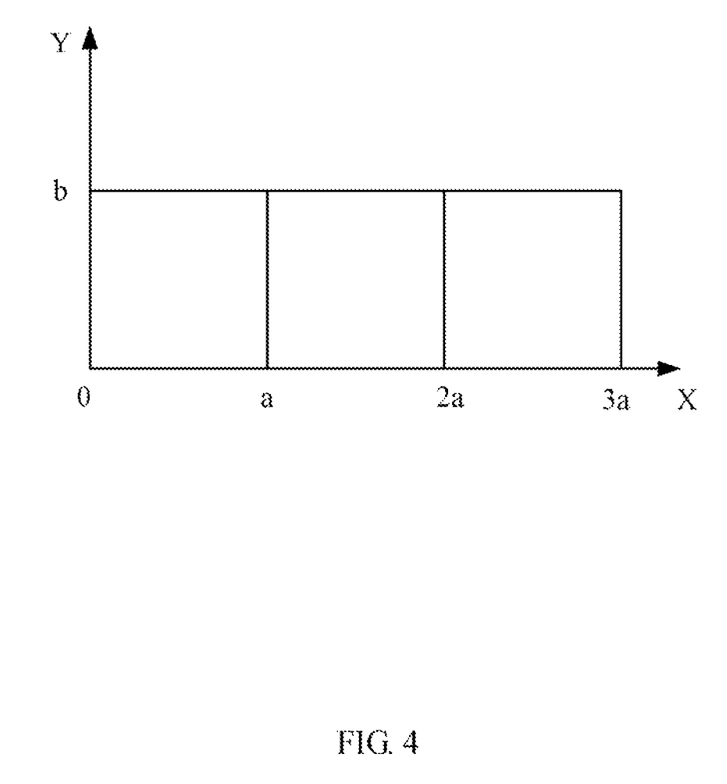
FIG. 4 is a view showing how to determine the new coordinate range of each monitor in a second embodiment.

Referring to FIG. 4, when the total number of the monitors 3 connected to the host 2 is three, the second position determining unit 7 of a left/top monitor 3 can receive the signal emitted from the first position determining unit 6 of a middle monitor 3, the first position determining unit 6 of the middle monitor 3 can receive the signal emitted from the second position determining unit 7 of the left/top monitor 3, the second position determining unit 7 of the middle monitor 3 can receive the signal emitted from the first position determining unit 6 of the right/bottom monitor 3, while the first position determining unit 6 of the right/bottom monitor 3 can receive the signal emitted from the second position determining unit 7 of the middle monitor 3. Thus the signal receiving module 102 of the left/top monitor 3 determines that the second position determining unit 7 of the left/top monitor 3 has received the signal, the coordinate determining module 103 of the left/top monitor 3 determines that the position of the left/top monitor 3 is on the left edge/up edge, and also determines that the new coordinate range of the left/top monitor 3 is (0, 0)-(a, b). The signal receiving module 102 of the middle monitor 3 determines that the first position determining unit 6 and the second position determining unit 7 of the middle monitor 3 have received the signal, the coordinate determining module 103 of the middle monitor 3 determines that the position of the middle monitor 3 is in the middle, and determines that the new coordinate range of the middle monitor 3 is (a+1, b)-(2a, b). The signal receiving module 102 of the right/bottom monitor 3 determines that the first position determining unit 6 of the right/bottom monitor 3 has received the signal, the coordinate determining module 103 of the right/bottom monitor 3 determines that the position of the right/bottom monitor 3 is on the right edge/bottom edge, and determines that the new coordinate range of the right/bottom monitor 3 is (2a+1, b)-(3a, b).

In the embodiment, the multi-monitor system 1 further includes a mode determining module 107. The mode determining module 107 is stored in the first storage unit 22 and executed by the first processor 21. The mode determining module 107 of the host 2 determines whether the host 2 is in an extended desktop mode. When the host 2 is in the extended desktop mode, the signal emitting module 101 of each monitor 3 controls the first position determining unit 6 and the second position determining unit 7 of each monitor 3 to emit signals.

Figure 5:
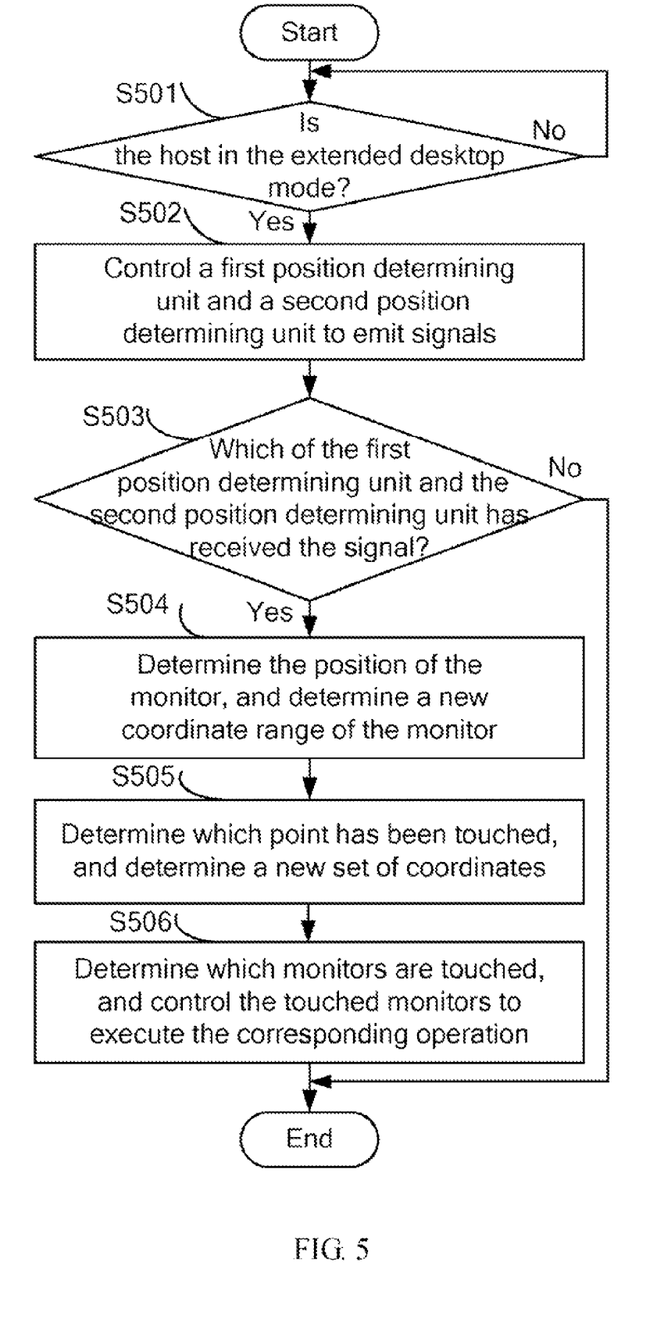
FIG. 5 is a flowchart of a multi-monitor method in accordance with an exemplary embodiment.

FIG. 5 shows a flowchart of a multi-monitor method in accordance with an exemplary embodiment.

In step S501, the mode determining module 107 of the host 2 determines whether the host 2 is in the extended desktop mode. When the host 2 is in the extended desktop mode, the procedure goes to step S502. Until the host 2 is in the extended desktop mode, the procedure remains in step S501.

In step S502, the signal emitting module 101 of each monitor 3 controls the first position determining unit 6 and the second position determining unit 7 of the corresponding monitor 3 to emit signal.

In step S503, the signal receiving module 102 of each monitor 3 determines which of the first position determining unit 6 and the second position determining unit 7 of the corresponding monitor 3 has received the signal.

In step S504, the coordinate determining module 103 of each monitor 3 determines the position of the corresponding monitor 3 among all of the monitors 3 according to the determined first position determining unit 6 and/or second position determining unit 7, and determines a new coordinate range of the corresponding monitor 3 in the Cartesian coordinate system according to the determined position of the monitor 3 and the stored initial coordinate range. The determination of a new coordinate range of the corresponding monitor 3 in the Cartesian coordinate system is as set out in the description above.

In step S505, the detecting module 104 of each monitor 3 determines the touched point in response to a user touch on the touch unit 4, and determines the new set of coordinates in the Cartesian coordinate system corresponding to the touched point according to the determined new coordinate range of the monitor 3.

In step S506, the executing module 105 of the host 2 determines one or more touched monitors 3 according to the determined one or more new set of coordinates and the determined new coordinate range of each monitor 3, and controls the determined one or more touched monitors 3 to execute the corresponding operation.

Although the current disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:
1. A multi-monitor system comprising:
   a host comprising:
      a first processor; and a first storage unit;
a plurality of monitors, each of which has an initial coordinate range (0, 0)-(a, b), sizes of each of the monitors being same, the monitors being capable of being used together to form a large monitor which has a Cartesian coordinate system consisting of all the monitors, each of the monitors communicating with the host and comprising:
   a first position determining unit for emitting and receiving signals;
   a second position determining unit for emitting and receiving signals;
   a second processor; and
   a second storage unit storing the initial coordinate range (0, 0)-(a, b) of the monitor, each set of coordinates in the initial coordinate range corresponding to one touch point on a touch unit of the monitor; and
a plurality of programs stored in the first storage unit or in the second storage units, the plurality of programs being executed by the first processor or the second processor, the plurality of programs comprising:
   a plurality of signal emitting modules, each of the signal emitting modules being operable by one of the second processors to control the first position determining unit and the second position determining unit of the corresponding monitor to emit signal;
   a plurality of signal receiving modules, each of the signal receiving modules being operable by one of the second processors to determine which of the first position determining unit and the second position determining unit of the corresponding monitor has received the signal;
   a plurality of coordinate determining modules, each of the coordinate determining modules being operable by one of the second processors to determine the position of the corresponding monitor among all of the monitors according to the determined first position determining unit and/or second position determining unit, and determine a new coordinate range of the corresponding monitor in the Cartesian coordinate system according to the determined position of the monitor and the stored initial coordinate range (0, 0)-(a, b);
   a plurality of detecting modules, each of the detecting modules being operable by one of the second processor to determine which point has been touched in response to a user touch on the touch unit, and determine the new set of coordinate in the Cartesian coordinate system corresponding to the touched point according to the determined new coordinate range of the monitor; and
   an executing module operable by the first processor to determine one or more touched monitors according to the determined one or more new set of coordinates and the determined new coordinate range of each monitor, and control the determined one or more touched monitors to execute the corresponding operation.

2. The multi-monitor system as described in claim 1 further comprising a number determining module, wherein the number determining module is operable by the first processor to determine the number of the monitors connected to the host, when the number of the monitors connected to the host is two and the signal receiving module operable by the second processor determines that the second position determining unit of the monitor has received the signal, the coordinate determining module operable by the second processor determines that the position of the monitor is on the left edge/up edge, and determines that the new coordinate range of the monitor is (0, 0)-(a, b); when the signal receiving module operable by the second processor determines that the first position determining unit of the monitor has received the signal, the coordinate determining module operable by the second processor determines that the position of the monitor is on the right edge/bottom edge, and determines that the new coordinate range of the monitor is (a+1, b)-(2a, b).

3. The multi-monitor system as described in claim 1 further comprising a number determining module, wherein the number determining module is operable by the first processor to determine the number of the monitors connected to the host; when the number of the monitors connected to the host is three and the signal receiving module operable by the second processor determines that only the second position determining unit of the monitor has received the signal, the coordinate determining module operable by the second processor determines that the position of the monitor is on the left edge/up edge, and determines that the new coordinate range of the monitor is (0, 0)-(a, b); when the signal receiving module operable by the second processor determines that the first position determining unit and the second position determining unit of the monitor have received the signal, the coordinate determining module operable by the second processor determines that the position of the monitor is in the middle, and determines that the new coordinate range of the monitor is (a+1, b)-(2a, b); when the signal receiving module operable by the processor determines that the first position determining unit of the monitor has received the signal, the coordinate determining module operable by the processor determines that the position of the monitor is on the right edge/bottom edge, and determines that the new coordinate range of the monitor is (2a+1, b)-(3a, b).

4. The multi-monitor system as described in claim 1 further comprising a mode determining module, wherein the mode determining module is operable by the host to determine whether the host is in an extended desktop mode; when the host is in the extended desktop mode, the signal emitting module operable by each of the second processors controls the first position determining unit and the second position determining unit of the corresponding monitor to emit signal.

5. A multi-monitor method implemented by a multi-monitor system, the multi-monitor system comprising a host and a plurality of monitors, sizes of each of the monitors being same, the monitors being capable of being used together to form a large monitor which has a Cartesian coordinate system consisting of all the monitors, each of the monitors comprising a first position determining unit and a second position determining unit, the first position determining unit and the second position determining unit being for emitting and receiving signals, each of the monitors communicating with the host, wherein the multi-monitor comprises:
   controlling the first position determining unit and the second position determining unit of the corresponding monitor to emit signal;
   determining which of the first position determining unit and the second position determining unit of the corresponding monitor has received the signal;
   determining the position of the corresponding monitor among all of the monitors according to the determined first position determining unit and/or second position determining unit, and determining a new coordinate range of the corresponding monitor in the Cartesian coordinate system according to the determined position of the monitor and a stored initial coordinate range (0, 0)-(a, b);

determining which point has been touched in response to a user touch on the touch unit, and determining the new set of coordinates in the Cartesian coordinate system corresponding to the touched point according to the determined new coordinate range of the monitor; and determining one or more touched monitors according to the determined one or more new set of coordinates and the determined new coordinate range of each monitor, and controlling the determined one or more touched monitors to execute the corresponding operation.

6. The multi-monitor method as described in claim 5, wherein the method further comprises:

determining the number of the monitors connected to the host;

determining that the position of the monitor is on the left edge/up edge when the number of the monitors connected to the host is two and the second position determining unit of the monitor has received the signal, and determining that the new coordinate range of the monitor is (0, 0)-(a, b); and determining that the position of the monitor is on the right edge/bottom edge when the number of the monitors connected to the host is two and the first position determining unit of the monitor has received the signal, and determining that the new coordinate range of the monitor is (a+1, b)-(2a, b).

7. The multi-monitor system as described in claim 5, wherein the method further comprises:

determining the number of the monitors connected to the host;

determining that the position of the monitor is on the left edge/up edge when the number of the monitors connected to the host is three and the second position determining unit of the monitor has received the signal, and determining that the new coordinate range of the monitor is (0, 0)-(a, b);

determining that the position of the monitor is in the middle when the number of monitors connected to the host is three and the first position determining unit and the second position determining unit of the monitor have received the signal, and determining that the new coordinate range of the monitor is (a+1, b)-(2a, b); and determining that the position of the monitor is on the right edge/bottom edge when the number of monitors connected to the host is three and the first position determining unit of the monitor has received the signal, and determining that the new coordinate range of the monitor is (2a+1, b)-(3a, b).

8. The multi-monitor method as described in claim 5, wherein the method further comprises:

determining whether the host is in an extended desktop mode; and controlling the first position determining unit and the second position determining unit of the corresponding monitor to emit signal when the host is in the extended desktop mode.

9. A non-transitory storage medium storing a set of instructions, the set of instructions capable of being executed by a first processor and a second processor of a multi-monitor system, cause the multi-monitor system to perform a guiding method, the multi-monitor system comprising a host and a plurality of monitors, sizes of each of the monitors being same, the monitors being capable of being used together to form a large monitor which has a Cartesian coordinate system consisting of all the monitors, each of the monitors comprising a first position determining unit and a second position determining unit, the first position determining unit and the second position determining unit being for emitting and receiving signals, each of the monitors communicating with the host, wherein the method comprises:

controlling the first position determining unit and the second position determining unit of the corresponding monitor to emit signal;

determining which of the first position determining unit and the second position determining unit of the corresponding monitor has received the signal;

determining the position of the corresponding monitor among of all the monitors according to the determined first position determining unit and/or second position determining unit, and determining a new coordinate range of the corresponding monitor in the Cartesian coordinate system according to the determined position of the monitor and a stored initial coordinate range (0, 0)-(a, b);

determining which point has been touched in response to a user touch on the touch unit, and determining the new set of coordinates in the Cartesian coordinate system corresponding to the touched point according to the determined new coordinate range of the monitor; and determining one or more touched monitors according to the determined one or more new set of coordinates and the determined new coordinate range of each monitor, and controlling the determined one or more touched monitors to execute the corresponding operation.

10. The non-transitory storage medium as described in claim 9, wherein the method further comprises:

determining the number of the monitors connected to the host;

determining that the position of the monitor is on the left edge/up edge when the number of the monitors connected to the host is two and the second position determining unit of the monitor has received the signal, and determining that the new coordinate range of the monitor is (0, 0)-(a, b); and determining that the position of the monitor is on the right edge/bottom edge when the number of the monitors connected to the host is two and the first position determining unit of the monitor has received the signal, and determining that the new coordinate range of the monitor is (a+1, b)-(2a, b).

11. The non-transitory storage medium as described in claim 9, wherein the method further comprises:

determining the number of the monitors connected to the host;

determining that the position of the monitor is on the left edge/up edge when the number of the monitors connected to the host is three and the second position determining unit of the monitor has received the signal, and determining that the new coordinate range of the monitor is (0, 0)-(a, b);

determining that the position of the monitor is in the middle when the number of monitors connected to the host is three and the first position determining unit and the second position determining unit of the monitor have received the signal, and determining that the new coordinate range of the monitor is (a+1, b)-(2a, b); and determining that the position of the monitor is on the right edge/bottom edge when the number of monitors connected to the host is three and the first position determining unit of the monitor has received the signal, and determining that the new coordinate range of the monitor is (2a+1, b)-(3a, b).

12. The non-transitory storage medium as described in claim 9, wherein the method further comprises:

determining whether the host is in an extended desktop mode; and controlling the first position determining unit and the second position determining unit of the corresponding monitor to emit signal when the host is in the extended desktop mode.

* * * * *